June 20, 1939.　　　　F. A. OZBURN　　　　2,162,966
FISH LURE
Filed June 28, 1938
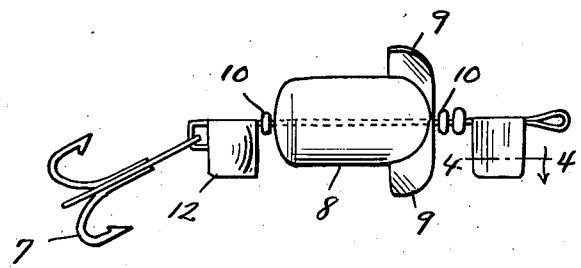
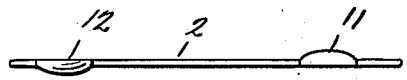
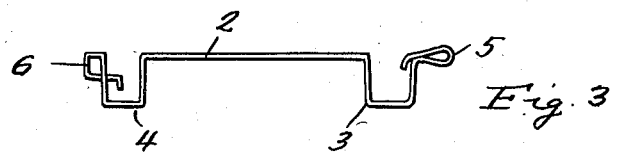
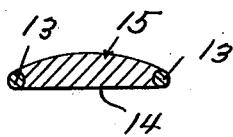
Inventor
Floyd A. Ozburn
By Clarence A. O'Brien
and Hyman Berman
Attorneys Patented June 20, 1939

2,162,966

UNITED STATES PATENT OFFICE 2,162,966

FISH LURE

Floyd Allan Ozburn, Los Angeles, Calif.

Application June 28, 1938, Serial No. 216,334

1 Claim. (Cl. 43—47)

My invention relates to improvements in fish lures and the principal object of the invention is to provide an inexpensive, practical device of this character which is counter-weighted so as to positively preclude twisting of the line either while casting or during retrieving.

Other, and subordinate objects are also comprehended by my invention, all of which together with the precise nature of my improvements will be readily understood when the succeeding description and claim are read with reference to the drawing accompanying and forming part of this specification.

In said drawing:

Figure 1 is a view in side elevation of a preferred embodiment of my lure,

Figure 2 is a view in bottom plan of the keel member,

Figure 3 is a view in side elevation of said keel member with the fins removed, and Figure 4 is a view in transverse section taken through one of said fins on the line 4—4 of Fig. 1.

Referring to the drawing by numerals, the lure of my invention comprises a rod-like keel member 1 formed of a suitable piece of wire and including an intermediate straight part 2, a pair of front and rear U-shaped portions 3 and 4 disposed in a common plane, a front eyelet 5 and a rear eyelet 6. The front eyelet 5 is for the attachment of the line, not shown, and the rear eyelet 6 for swingably supporting a suitable hook such as shown at 7 in Figure 1. The straight part 2 has rotatably mounted thereon a suitable spinner 8 with propeller blades 9, said spinner 8 rotating between the usual button-like collars 10 on said part 1.

A pair of square front and rear fins 11 and 12 are fitted into the front and rear portions 3 and 4, respectively, as by grooved edges 13 on said fins. The fins 11, 12, are flat, as at 14, on relatively opposite sides and convex on their other sides, as at 15, and as best shown in Figure 2.

By virtue of the described fins 11 and 12 the lure is counter-weighted so that either during casting or retrieving it is stabilized against turning thereby obviating twisting of the line. Also during trolling or retrieving in the water, the oppositely convexed fins 11 and 12 function as keel rudders stabilizing the lure in the water and thereby preventing the hook 7 from rotating. Since the lure is stabilized under the conditions described and in the manner set forth the usual swivel commonly used for connecting a lure to a line may be dispensed with.

The invention will, it is believed, be readily understood from the foregoing without further explanation, but, it is to be understood that the present disclosure is illustrative rather than restrictive and right is herein reserved to modifications in structure described falling within the scope of the subjoined claim.

What I claim is:

In a fish lure, a rod-like keel member having a pair of eyelets at its opposite ends for the attachment of a line and hook thereto, respectively, a spinner rotatably mounted on said member, and a pair of front and rear fins depending from said member in the front and rear of said spinner, respectively, functioning as counter balancing weights to stabilize the lure against turning in the air or water, said fins each having a flat side face and a convex side face, the convex side faces being arranged on relatively opposite sides of the lure to maintain the latter in a straight course in the water.

FLOYD ALLAN OZBURN.